Patented Dec. 10, 1946

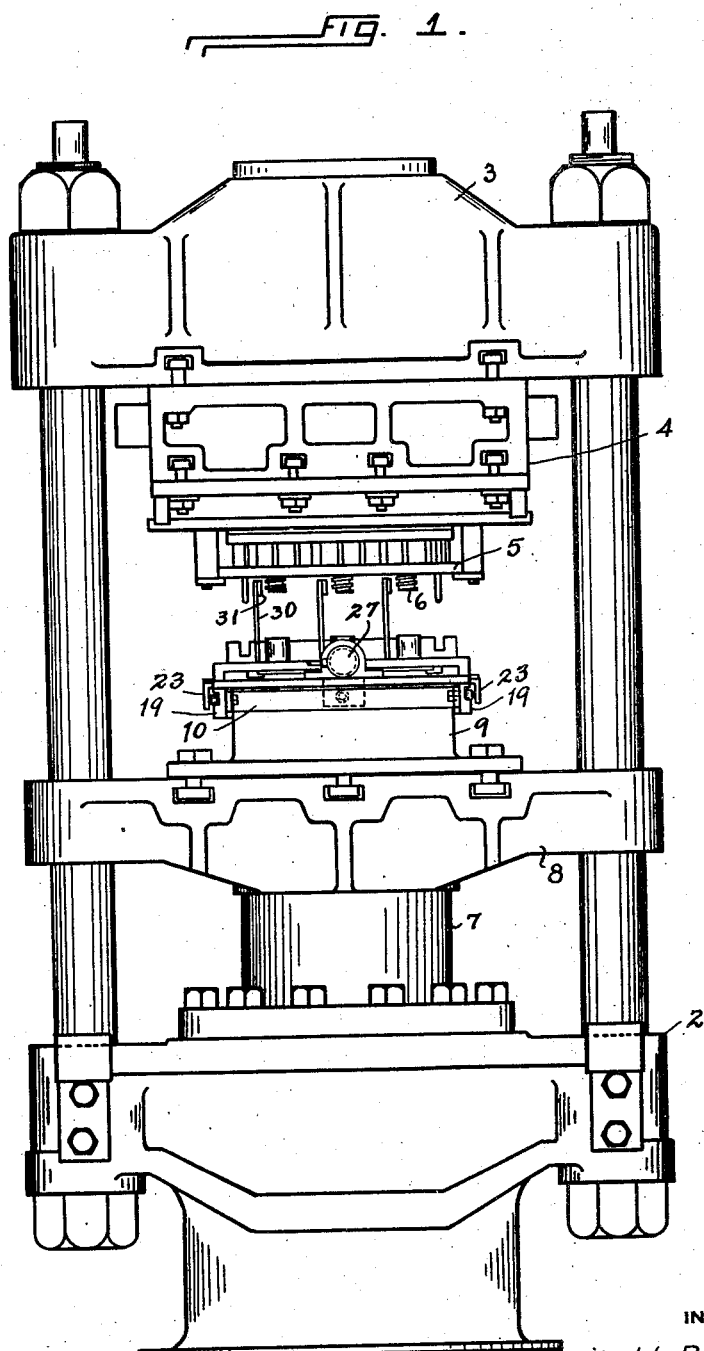

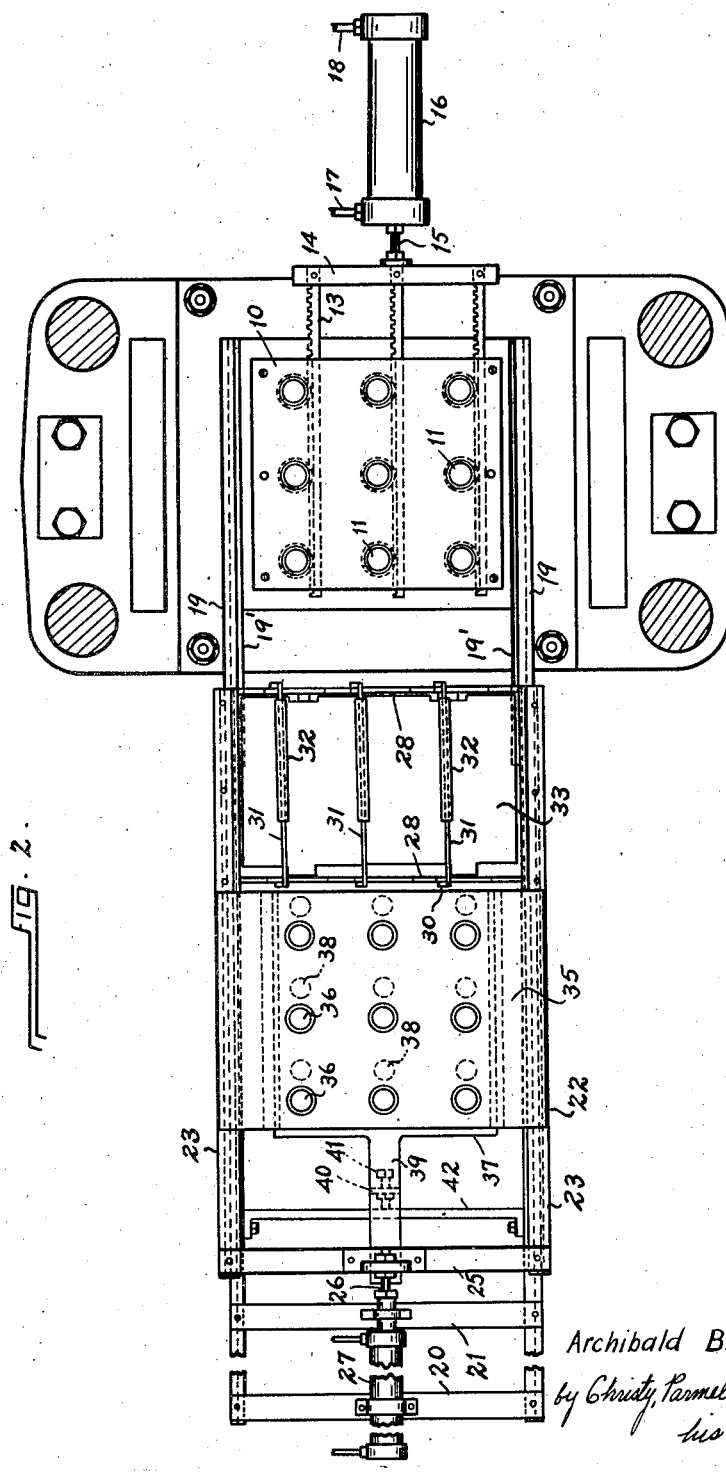

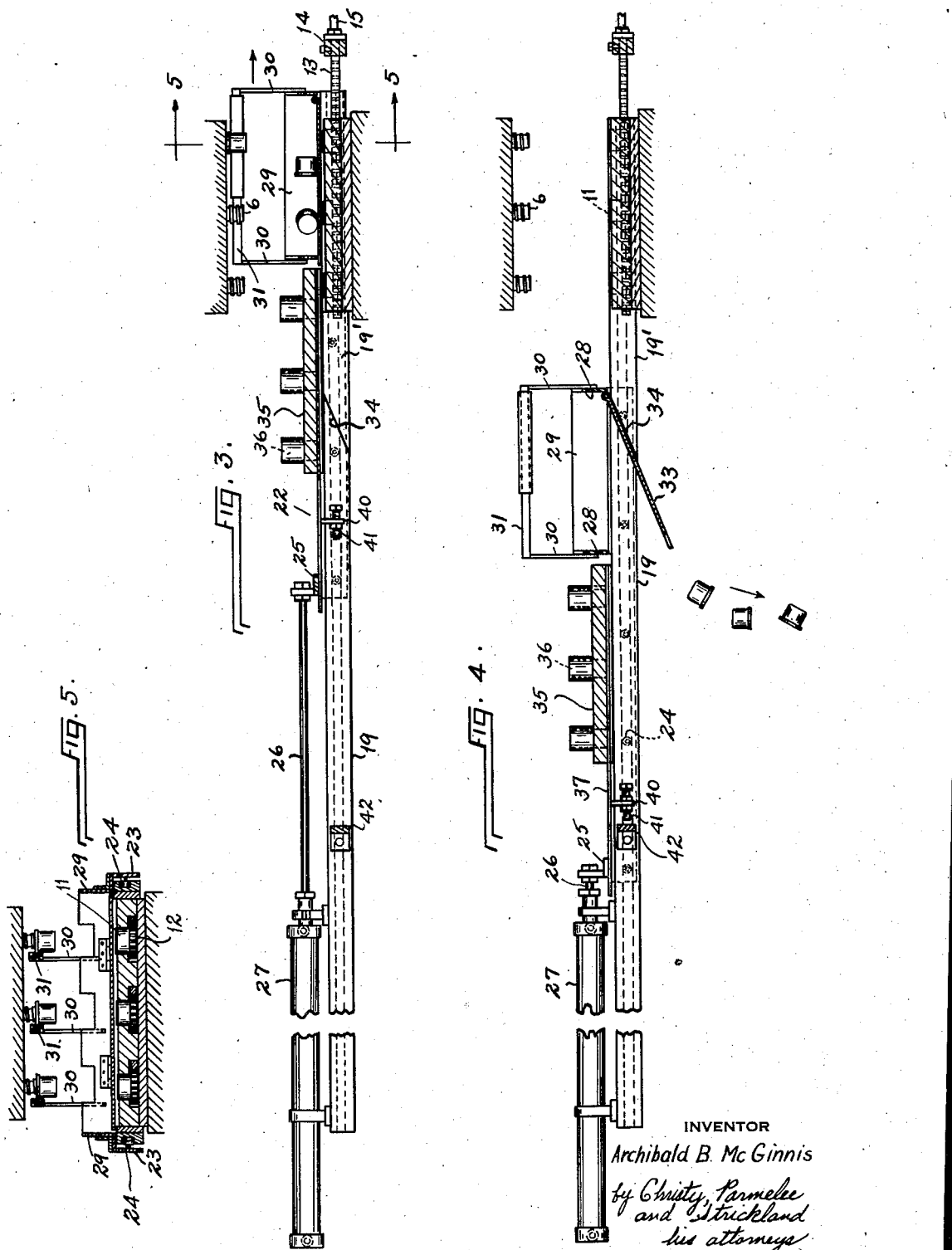

2,412,411

UNITED STATES PATENT OFFICE 2,412,411

APPARATUS FOR THE MOLDING OF PLASTIC ARTICLES

Archibald B. McGinnis, Wheeling, W. Va., assignor to Wheeling Stamping Company, Wheeling, W. Va., a corporation of West Virginia Application February 18, 1941, Serial No. 379,436

10 Claims. (Cl. 18—16)

1

This invention pertains to the molding of plastic articles such as bottle caps, container closures, knobs and the like from plastics such as synthetic resins and pertains especially to an improvement in a multiple mold press for the manufacture of such articles.

Conventional hydraulic presses are commonly employed for the manufacture of articles of the class referred to. Such presses are provided with a fixed upper mold plate and an opposed vertically movable lower mold plate. The two mold plates have a multiple of complementary mold elements thereon so that a number of articles may be molded with each cycle of operation of the press. In the molding of screw-threaded parts one of the mold elements of each individual mold unit comprises a member such as a force pin which has threads thereon for forming the threads in the article to be produced. Consequently the articles when formed have a screw-threaded engagement with such parts. Usually these screw-threaded mold elements are on the upper mold plate. One method of freeing the molded articles from the mold plate has been to remove the mold plate entirely from the press and then individually unscrew the molded articles. The operation of removing the mold plate, stripping it, and returning it to the press, or replacing one mold plate with another, involves a loss of time in each molding cycle which reduces the maximum productive capacity of the press not only because of the actual time required to physically move the parts, but also because of the loss of heat from the mold plates while they are out of the press.

The present invention provides a molding apparatus for use in conjunction with presses having multiple molds wherein the mold plates may remain in fixed operating position in the press and wherein the molded articles will be automatically stripped from the parts on which they are formed and discharged at one side of the press. The invention further contemplates an arrangement wherein the mold cavities may be charged with a molding compound as the operation of stripping proceeds so that when the stripping cycle is completed the cavities of the lower mold plate will be charged for the commencement of another molding cycle. Considerable productive time is thus saved so that the capacity of each press on each set of mold plates is considerably increased and considerably less physical effort is required on the part of the operator.

The present invention also contemplates an arrangement whereby relative movement may be effected between the complementary parts of each individual molding unit as the press is opening after the completion of the molding cycle for loosening or partially unscrewing the formed articles from the mold member to which they adhere, thereby relieving gas pressure inside the threaded parts before the molded articles are deformed by such pressure, such loosening of the pieces from the mold members to which they are screwed also facilitating the subsequent complete removal of the articles and also facilitating the loosening of any flash.

My invention may be readily understood by reference to the accompanying drawings in which—

Figure 1 is a front elevation of a press embodying my invention;

Figure 2 is a horizontal section in substantially the plane 2—2 of Figure 1;

Figure 3 is a fragmentary vertical section showing only a portion of the press and showing the stripping and charging mechanism being entered into the space between the two molds, the parts moving in the direction of the horizontal arrow;

Figure 4 is a view similar to Figure 3 showing the parts retracted to their normal position;

Figure 5 is a transverse vertical section in the plane of line 5—5 of Figure 3.

Referring to the drawings, 2 designates a hydraulic press of conventional construction having a fixed crosshead 3 at the top thereof from which is suspended a support 4 which supports an upper mold plate 5. The upper mold plate has a plurality of mold elements 6 thereon, these being shown as externally threaded force pins for forming the interiors of closure caps. The press is provided with a hydraulic ram 7 that reciprocates a lower press member 8 which has a supporting structure 9 thereon and carried on the supporting structure 9 is a lower mold plate 10. The lower mold plate 10 has mold elements 11 thereon which are complementary to the mold elements 6 on the upper mold plate. As best shown in Figures 2 and 5 the mold elements 11 are rotatable cup-like members, each having an annular series of teeth 12 at the bottom thereof, each having a cavity on its interior into which the corresponding force pin 6 projects when the mold is closed.

The mold elements 11 are arranged in rows lengthwise and crosswise of the mold plate in which they are mounted. Slidably received in the mold plate are a plurality of rack bars 13, the number of rack bars corresponding to the number of rows of mold elements. These rack bars engage the teeth on the peripheries of the mold elements of the respective rows so that by moving the rack bars 13 longitudinally the mold elements may be rotated.

All of the rack bars 13 are connected to a common crosshead 14. This crosshead 14 is, in turn, attached to a piston rod 15 which has a piston (not shown) operating in a fluid pressure cylinder 16. The fluid pressure cylinder 16 has fluid pressure connections 17 and 18 at each end thereof so that the rack bars may be moved in either direction. The source of fluid pressure from which the cylinder 16 is operated is not shown.

Mounted on the lower crosshead in the machine for movement up and down therewith are parallel rails or guides 19, one being at each side of the lower mold plate, these guides projecting forwardly a considerable distance to the front of the press. The outer ends of the guides are connected together by crosspieces 20 and 21, and the outer faces of the guides or rails 19 are provided with longitudinally extending grooves or channels.

The rails 19 serve as a support for a reciprocable carriage designated generally as 22. The carriage 22 has parallel angle bars 23 at each side thereof, the horizontal flange of the angle members 23 extending over the tops of the rails 19, the vertical flanges of the angles depending outside the rails 19 as best shown in Figure 5. Rollers 24 mounted on the vertical flanges of the angle members 23 are received in the grooves in the outer faces of the rails providing a rolling support for the carriage 22.

The carriage 22 is provided at its forward end with a crosspiece 25. Connected to the crosspiece 25 is the free end of a piston rod 26. The piston rod 26 is provided with a piston (not shown) that operates in a fluid pressure cylinder 27 that is supported on the crosspieces 20 and 21. The arrangement is such that by operation of the piston in the cylinder 27 the carriage 22 may be reciprocated along the rails 19, the carriage moving in a fore and aft direction, the left-hand side of the machine as shown in Figure 2 constituting the front.

On the right-hand end of the carriage as viewed in Figure 2 there are two transversely extending spaced plates 28. At each side of the carriage, as shown in Figure 5, there are other upstanding plates 29, the plates 28 and 29 forming a substantially rectangular cap-receiving enclosure. Supported on the plates 28 are spaced upstanding supports 30 to which are attached horizontal longitudinally extending bars 31, the number of bars corresponding to the number of longitudinal rows of mold elements 11. In Figure 2 there are illustrated three rows of molds and consequently there are three bars 31. Each of these bars is provided along at least a portion of its length with a covering of a friction material such as rubber. This covering, shown in Figure 2, is designated 32. The arrangement is such that when the carriage is reciprocated to the right as viewed in Figure 2, the friction elements 31—32 will engage the peripheries of the formed articles which adhere to the force pins of the upper mold plate and by frictional engagement with such molded articles unscrew them so that they drop into the enclosure formed by the upstanding walls or plates 28 and 29. The height of the bars 31 is, of course, such that the stripping members will engage the caps on the upper force pin when the lower member of the press is in its lowermost operating position.

Hinged to the rear of the carriage 22 is a metal plate 33 forming a bottom for the enclosure into which the caps fall. The rails 19 are provided on their inner faces with supporting strips 19' (see Figure 2) which project just a slight distance beyond the bed of the press and which terminate in inclined shoulders 34 (see Figure 3). The arrangement is such that when the carriage is in its left-hand position, as shown in Figure 4, the hinged bottom 33 is unsupported by the strips 19' and the hinged bottom 33 can drop down into position as shown in Figure 4 where it rests on the inclined ends 34 of the strips 19'. When the carriage is moved to the right from the position shown in Figure 4 to the position shown in Figure 3, the inclined ends 34 of strips 19' cam or force the hinged bottom plate up after which it is held up as it rides along on the strips 19', thus forming a closed bottom for the cap-receiving enclosure during the time the stripper is moving in over the bottom mold plate and below the top mold plate to strip the molded articles therefrom. Then as the carriage moves back to the position shown in Figure 4 the bottom 33 again drops down, discharging the caps and any flash which has been collected downwardly and forwardly clear of the press.

Mounted on the carriage 22 is a crossplate 35 having a plurality of charge-receiving cavities 36 thereon corresponding in number and position to the cavity elements 11 in the lower mold plate. Below the fixed plate 36 there is a thin sheet metal plate 37 which is also on the carriage, being suspended from the underside of the plate 35 and which has holes 38 therein which correspond in number and position to the cavities 36 but which, by movement of the plate 37, may be shifted into and out of register with the cavities 36. The plate 37 has a forwardly extending tongue 39 thereon and on the underside of this tongue a depending lug 40 which has a set-screw 41 passing therethrough. Near the limit of travel of the carriage to the left as viewed in Figure 4 there is a fixed cross-member 42 which is in the path of travel of the set-screw 41 so that as the carriage moves toward the left near the limit of its travel the set-screw coming into contact with the cross-bar 42 prevents the plate 37 from moving further in the direction of travel of the carriage and the plate 37 is shifted to the position shown in Figure 2 where the holes 38 are out of register with the cavities 36. When the carriage moves to the right beyond the position shown in Figure 3 to a point where the cavities 36 are over the mold elements 11 and in register therewith the screw 41 abuts against the lower mold plate effecting a relative movement of the plate 37 in a direction to bring the openings 38 into register with the cavities 36 and thereby allow the charges of a material which has previously been placed in the cavities 36 to drop into the mold cavities 11 and thereby charge all of the mold automatically.

In the operation of the machine, assuming the mold cavities 11 to have been charged and the parts to be in the position shown in Figure 4, the press is operated to raise the lower mold plate 10 into cooperative engagement with the upper mold plate 5, thus molding the plastic charges which have been placed in the cavities. Just as the press is operated to open the molds, fluid under pressure is admitted through the pipe 18 to operate the racks 13 thereby rotating the mold elements 11. The mold elements 11 are rotated sufficiently to loosen the molded articles from the force pins on which they are formed but not sufficiently to completely unscrew the articles. While the press is closed and the plastic material is curing, the operator places fresh charges of material in each of the cavities 36. When the press is sufficiently opened the cylinder 27 is operated. The strippers 31—32 first pass under the upper mold plate, completing the unscrewing of the formed articles by frictional engagement with the peripheries thereof and the articles fall into the enclosure provided for receiving them. Movement of the carriage toward the right is continued until the charging plate 35 is over the lower mold plate when the gate member or plate 37 is operated to recharge the mold cavities. After the mold cavities have been charged the cylinder 27 is operated to withdraw the carriage and by the time the carriage reaches its outer limit of travel the plate or gate 37 has been shifted back to the position where it closes the charging cavities 36 and the bottom plate member 33 of the enclosure has dropped down to allow the caps to be discharged.

The provision of the racks 13 in conjunction with the teeth 12 for turning the mold cavities has two advantages. First, the cavities act as wrenches for turning the caps on the force pins, thus breaking the tight joint that exists between the caps and the force pins enabling the complete removal of the caps to be effected by the friction strippers. Secondly, because this operation is to take place before the caps are lifted entirely clear of the mold cavities and preferably just as soon as the press opens gases which may be trapped in the caps are immediately vented by the partial unscrewing of the caps. This prevents distortion of the caps which are still in a somewhat plastic stage by the expanse of pressure of these gases. It has heretofore been proposed to effect such partial unscrewing of the caps by turning the force pins instead of the cavity members and my invention contemplates that such an arrangement may be used. However, I would prefer to turn the cavity elements because this moves the caps relatively to the upper mold plate and tends to break loose any flash which may adhere to the upper mold plate, whereas if the force pins are turned the caps do not rotate against the upper mold plate and other means must be provided for loosening any such adherent flash.

The present invention provides a mechanism which enables the press to be operated automatically on a regular time cycle. The caps can be formed and removed from the press without shifting the position of either of the mold plates. The operation of stripping is accompanied by the operation of charging molds for the next cycle. The arrangement for receiving the caps when they are stripped also provides for the collection of any flash or pieces of plastic material that may fall, preventing such substances from getting into the cavities of the lower mold member. While the controls of the various hydraulic cylinders have not been illustrated, these can be all correlated as will be readily understood by those skilled in the art.

The invention enables the productive capacity of a press to be considerably increased and reduces the manual labor required on the part of the operator. While I have illustrated and described one particular embodiment of my invention it will be understood that this is merely by way of illustration and that the parts may be otherwise constructed within the contemplation of my invention and under the scope of the following claims. It will also be understood that while I have referred to the molded objects as caps the invention is equally applicable to the molding of other screw-threaded objects and that I have referred to caps specifically only for purposes of description.

I claim:

1. In combination with a molding press having upper and lower press members, one of which is movable toward and away from the other, a mold plate on the upper press member having a plurality of mold elements thereon which have a threaded engagement with the articles formed in the press, a lower mold plate on the lower press member having a plurality of mold elements therein which are complementary to the mold elements on the upper plate, means on the lower press member providing a trackway which extends to one side of the press, a carriage movable along the trackway from a position to one side of the press to a position over the lower mold member, stripper means on the carriage for engaging articles on the mold elements of the upper mold member and unscrewing them when the carriage is moved from a position at one side of the press to a position between the press members, and a mold charging device on the carriage movable across the lower mold plate upon reciprocation of the carriage.

2. An attachment for molding presses having upper and lower press members, one of which is movable toward and away from the other, said press members having complementary mold plates thereon, the upper mold plate having mold elements adapted to have a screw-threaded engagement with the articles which are formed on the press, said attachment comprising a carriage movable from a position over the lower press member to a position to one side thereof, a trackway along which the carriage is movable and upon which it is supported, stripping means on the carriage adapted to remove articles from the upper mold plate when the carriage is projected into position between the upper and lower mold members and a charging mechanism on the carriage immediately adjacent the stripping mechanism and adapted to be moved with the carriage into position over the lower mold plate and to be so positioned when the stripping operation is completed, and means for operating the carriage.

3. An attachment for molding presses having upper and lower press members, one of which is movable toward and away from the other, said press members having complementary mold plates thereon, the upper mold plate having mold elements adapted to have a screw-threaded engagement with the articles which are formed on the press, said attachment comprising a carriage movable from a position over the lower press member to a position to one side thereof, a trackway along which the carriage is movable and upon which it is supported, stripping means on the carriage adapted to remove articles from the upper mold plate when the carriage is projected into position between the upper and lower mold members and a charging mechanism on the carriage immediately adjacent the stripping mechanism and adapted to be moved with the carriage into position over the lower mold plate and to be so positioned when the stripping operation is completed, means for operating the carriage, means on the carriage providing an enclosure into which the articles which are stripped drop, a hinged plate on the carriage in said enclosure, and means for supporting the hinged plate against downward movement when the carriage is projected into position between the press members, said means terminating at a point exteriorly of the press whereby the hinged plate may drop when the carriage is withdrawn from between the upper and lower members of the press.

4. An attachment for molding presses having upper and lower press members, one of which is movable toward and away from the other, said press members having complementary mold plates thereon, the upper mold plate having mold elements adapted to have a screw-threaded engagement with the articles which are formed on the press, said attachment comprising a carriage movable from a position over the lower press member to a position to one side thereof, a trackway along which the carriage is movable and upon which it is supported, stripping means on the carriage adapted to remove articles from the upper mold plate when the carriage is projected into position between the upper and lower mold members and a charging mechanism on the carriage immediately adjacent the stripping mechanism and adapted to be moved with the carriage into position over the lower mold plate and to be so positioned when the stripping operation is completed, means for operating the carriage, means on the carriage providing an enclosure into which the articles which are stripped drop, a hinged plate on the carriage in said enclosure, and means on the trackway along that portion thereof which extends between the press members for supporting the hinged plate in a cap-receiving position, said means terminating exteriorly of the press to enable the hinged plate to swing downwardly for discharging the molded articles therefrom.

5. Molding apparatus comprising a press having opposed complementary mold plates therein, one above the other, means for moving one of the plates vertically relatively to the other, means on the upper mold plate adapted to have a threaded engagement with the article which is molded, the lower mold plate having a cavity element therein which cooperates with said means on the upper mold plate, means for rotating the cavity element a distance only sufficient to partially unscrew the formed article from said means on the upper mold plate, and other means normally positioned to one side of the press movable into the space between the two press members for removing the article from the upper plate after it has been partially unscrewed.

6. Mold charging apparatus for a multiple mold press wherein there is a mold plate having a plurality of mold cavities comprising a trackway secured to a press, a carriage movable horizontally along the trackway from a position at one side of the press to a position over said mold plate, a charge carrier on the carriage having a plurality of receptacles thereon corresponding in spacing and number to the cavities in the mold plate, a relatively movable closure plate under the carrier having openings therein which are normally out of register with the receptacles but which may be brought into register with the receptacles, means for reciprocating the carriage, means governed by the travel of the carriage for effecting movement of said closure plate when the receptacles on the carrier are in register with the corresponding cavity of the mold plate, and a stripper on said carriage in advance of said carrier movable with the carrier for removing previously formed articles from the press before the carrier is in position to charge the cavities, said stripper and carrier being both carried to the same side of the press with the carriage when the carriage is moved to said position at one side of the press.

7. Molding apparatus of the class described comprising a press having an upper mold plate and a lower mold plate, means for raising and lowering one of the mold plates with respect to the other, the upper mold plate having a plurality of mold elements thereon of a character which have a screw-threaded engagement with the articles which are formed in the press, the lower mold plate having a plurality of complementary mold elements that cooperate with the mold elements of the upper plate, and a carriage having a plurality of stripping elements thereon normally positioned at one side of the press and movable in a horizontal plane from the position at one side of the press to a position under the upper mold plate, said stripping elements each being frictionally arranged to engage the peripheries of a number of articles on the upper mold plate and unscrew them from the mold elements to which they are attached as the carriage moves horizontally relatively to the upper mold plate, said carriage being movable across the top of the lower mold plate, and means on the carriage for charging the mold elements of the lower mold plate when the carriage reaches the limit of its movement in one direction.

8. Molding apparatus comprising a press having upper and lower plates carrying multiple pairs of complementary mold elements thereon, one of said plates being movable towards and away from the other to mold articles between said elements, the elements of the upper plate being adapted to retain the molded articles thereon, and the elements of the lower plate being adapted to receive charges of molding material, means for supplying charges of molding material to the lower mold elements including a movable frame mounted for movement transversely of said press across the top of the elements on the lower mold plate, a charging tray on said frame, means carried by said frame at one side of the charging tray for freeing said molded articles from said upper mold elements, and a receiving tray carried by said movable frame and positioned below said article freeing means for receiving the molded articles.

9. Molding apparatus comprising a press having upper and lower plates carrying multiple pairs of complementary mold elements thereon, one of said plates being movable toward and away from the other to mold articles between said elements, the elements of the upper plate being adapted to retain the molded articles thereon, and the elements of the lower plate being adapted to receive charges of molding material, a movable frame mounted for movement transversely of said press from a position at one side of the press to a position between the mold elements over the top of the mold elements of the lower mold plate, and carrying a charging tray and a receiving tray at one side of the charging tray, and means for freeing said molded articles from said upper mold elements when said receiving tray is positioned below said elements.

10. In a machine for molding screw-threaded articles, in combination, a press having a pair of separable mold parts mounted for relative vertical movement into and out of engagement to form articles, the upper of said parts having a plurality of thread-forming mold elements thereon adapted, upon separation of the mold parts, to retain the molded articles thereon, the lower mold part having mold cavities therein for cooperation with the thread-forming elements and adapted to receive charges of molding material, a movable frame mounted for movement transversely of the press from a position at one side of the press to a position over the top of the lower mold part and carrying a charging tray and a receiving tray to one side of the charging tray, and friction elements carried by said frame above the receiving tray for engaging the molded articles on the thread-forming elements when the frame is moved over the top of the lower mold part and thereby unscrew the said articles from the thread-forming elements, the said receiving tray catching the molded articles and debris as the articles are unscrewed and carrying them to a position at one side of the press when the frame is withdrawn from its position over the top of the lower mold part.

ARCHIBALD B. McGINNIS.